Patented May 16, 1939

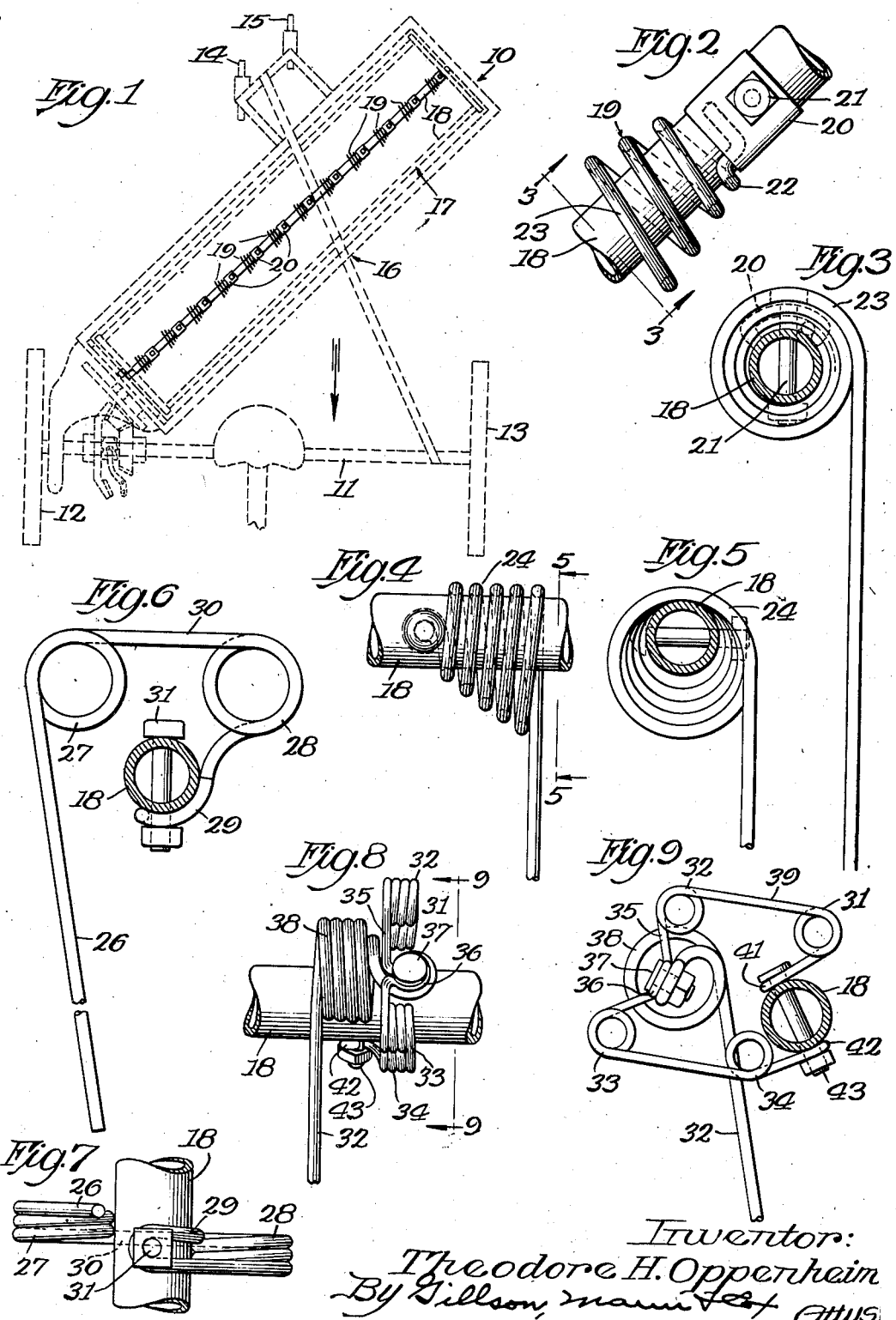

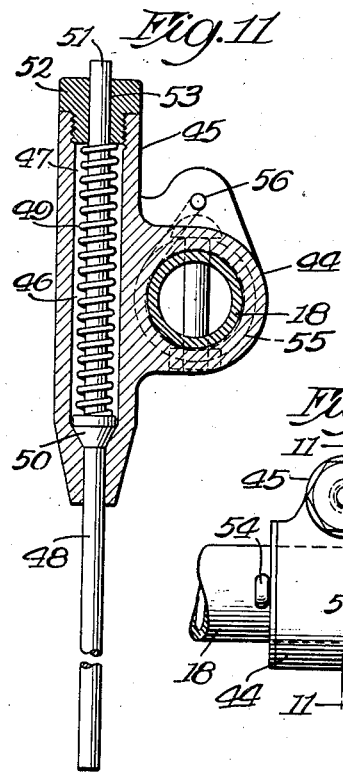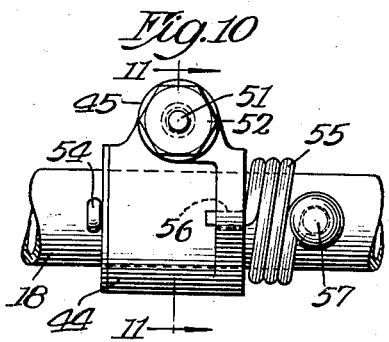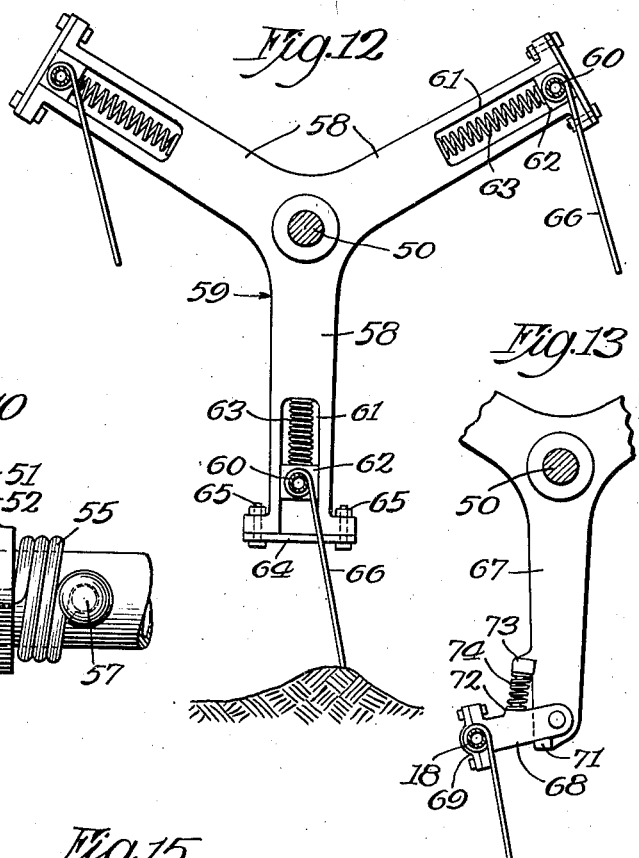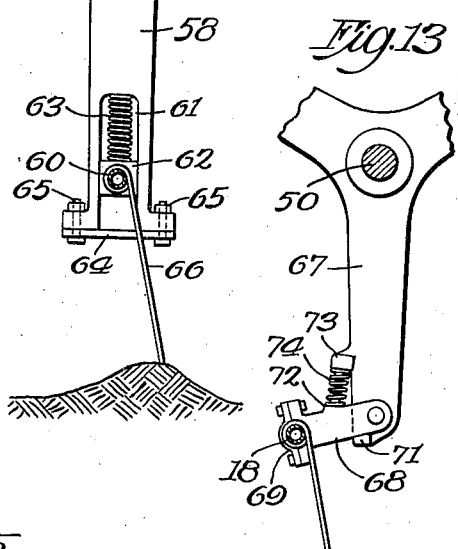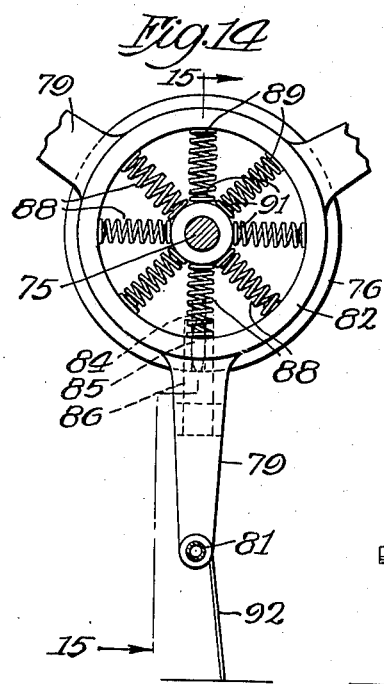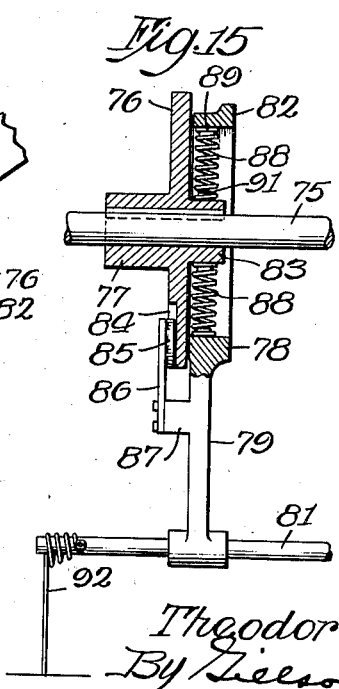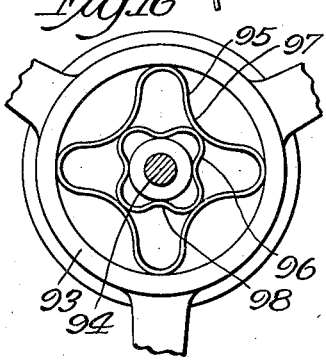

2,158,299

UNITED STATES PATENT OFFICE 2,158,299

RAKE AND TEDDER MECHANISM

Theodore H. Oppenheim, Coldwater, Ohio

Application October 29, 1934, Serial No. 750,452

12 Claims. (Cl. 56—400)

This application relates to farm implements and more particularly to rakes or combined rakes and tedders.

One of the principal objects of the invention is the provision of a new and improved rake or combined rake and tedder having novel means for permitting bodily upward movement of a tooth or teeth of the rake or tedder mechanism when the same encounters an obstruction extending above the surface of the ground during the operation of the device.

Another object of the invention is the provision of a new and improved mechanism for mounting a tooth that will permit vertical movement of the individual tooth to compensate for the hummocks, stones, or other obstructions extending above the surface of the ground, or to compensate for the supporting wheels dropping into depressions and the like while the tooth is in service during the raking or tedding operation.

A further object of the invention is the provision of a new and improved rake mechanism in which novel means are provided for movably mounting the rake bars whereby either end is free to move vertically or the entire bar move upwardly bodily when some or all of the teeth encounter an obstruction extending above the surface of the ground or one or more of the wheels drop into a depression.

Another object of the invention is the provision of a new and improved raking drum having novel means whereby the tooth supporting portion of the drum may have a vertical movement independently of the driving portion of the drum.

A still further object of the invention is the provision of mechanism for supporting and permitting bodily upward movement of the teeth of rakes and tedders that is inexpensive to manufacture, easily installed on the conventional rake or tedder, that is efficient in use, and that is not easily broken or likely to get out of order.

Other and further objects and advantages of the invention will appear from the following description taken in connection with the accompanying drawings, in which Fig. 1 is a plan view of a rake bar showing the invention in position thereon and showing the remaining portion of the implement in dotted lines;

Fig. 2 is a plan view of a portion of the rake bar with the invention in position thereon;

Fig. 3 is a section on the line 3—3 of Fig. 2;

Fig. 4 is a side elevation of a portion of a rake bar showing a modified form of tooth thereon;

Fig. 5 is a section on the line 5—5 of Fig. 4;

Fig. 6 is a transverse section of a rake bar showing a modified form of rake tooth thereon;

Fig. 7 is a bottom plan view thereof;

Fig. 8 is a plan view of a further modified form of tooth construction;

Fig. 9 is a section on the line 9—9 of Fig. 8;

Fig. 10 is a top plan view of a further modified form of tooth construction and the arrangement thereof on a rake bar, the bar shown with parts broken away;

Fig. 11 is a section on the line 11—11 of Fig. 10;

Fig. 12 is a vertical section of a rake drum showing a further modified form of the invention in which the tooth bars are adjustable;

Fig. 13 is a vertical section of a portion of a rake drum showing a modified form of construction in which the rake bars are vertically movable;

Fig. 14 is a modified form of the invention in which a portion of the drum, together with the teeth, are vertically movable;

Fig. 15 is a section on the line 15—15 of Fig. 14;

Fig. 16 is a modification of the form of construction shown in Figs. 14 and 15.

In the operation of rakes, tedders and the like, it is common practice to provide a resilient coil in the body of the tooth adjacent to the attaching end to provide resiliency and permit the tooth to spring rearwardly and forwardly, that is, move about the axis of the coil as a center when the tooth encounters an obstruction. Such an arrangement does not provide a bodily upward movement of the raking portion of the tooth and consequently when the tooth meets an obstruction extending above the surface of the ground, considerable strain is placed on the tooth and on the bar to which it is attached. This pressure will cause the tooth or teeth to tend to dig in the obstruction, or if the obstruction is sufficiently hard, as a stone or the like, the tooth or teeth striking the obstruction will ride over the same, possibly raising the drum and frame, thereby not only placing the same under strain but also elevating the remaining teeth above the material being operated upon and leaving it in the field.

The present invention seeks to remedy these difficulties by the provision of means for permitting upward movement of the teeth.

Referring now to the drawings, the reference character 10 designates a combination rake and tedder having the axle 11, the main supporting wheels 12 and 13, rear pivoted or caster wheels 14 and 15 and the frame 16, in which is mounted the rotating raking drum 17. The mechanism thus far described is shown in dotted lines, and since it is of the usual or any well-known construction, it is not thought necessary to illustrate or further describe the same. The drum 17 is provided with a plurality of rake bars or tooth supporting bars 18 journaled therein, one of which is shown in full lines in Fig. 1. While this rake bar is shown as being straight, it may be arranged spirally about the drum, if desired. In the construction shown, the rake bars 18 are partially rotated by conventional mechanism in order to maintain the teeth in a depending position as shown in Figs. 12 and 13. Since the means for rotating the drum and for maintaining the teeth in a depending position are conventional, they are merely indicated in dotted lines in Fig. 1.

A plurality of rake teeth 19 are attached to each bar in any suitable manner, as by means of the clip 20 and bolt 21. Each of the teeth is provided at its upper end with a cone-shaped resilient coil 22 which extends about the rake bar 18. The small diameter of the cone is adjacent to the attaching end of the coil so that the outer or larger turn 23 is spaced the greatest distance radially from the bar, the remaining coils being spaced a decreasing distance therefrom.

The teeth may be attached so that the larger coils are toward the front of the machine as shown in Figs. 1, 2 and 3, or they may be so attached that the larger coils are toward the rear as shown in Figs. 4 and 5.

The coil is loosely wound so that when the same is attached to the bar, as shown in Fig. 2, the teeth will have a universal movement during service. The tooth may move vertically a distance equal to that between the lower part of the bar and the lower portion of the coils. In the operation of the device, when a tooth strikes an obstruction extending above the surface of the ground, the tooth is free to move bodily upwardly independently of the remaining teeth on the bar 18 until the coils engage said bar. It is also free to move rearwardly or laterally due to the spacing of the coils from the bar and to the spacing of the turns or coils from each other.

In order to provide for an increase in this vertical movement of the teeth, the coils of the spring may be materially enlarged but preferably they are wound in such a manner that when attached to the bar, as shown in Figs. 4 and 5, the top portions of the coils 24 will be in contact with the upper surface of the bar so that a maximum space will be left between the lower portion of the bar and the lower portion of the coils, as clearly shown in said figures.

In Fig. 6 is shown a modified form of tooth construction which will also permit upward movement of the individual teeth when they come in contact with an obstruction. In this form of construction, each of the teeth 26 is provided with the conventional resilient coil 27 for permitting rearward or rotational movement of the tooth and with an additional resilient coil 28 that will permit vertical movement of the tooth. As shown, these coils are so arranged that the connecting portion 30 is substantially horizontal whereby an upward movement of the raking portion of the tooth 26 will cause the coil 28 to tend to wind or unwind, depending on how it is wound. The two coils are shown as being wound in one direction, but it is understood that they may both be wound in the opposite direction or one may be wound in one direction and the other in the opposite direction, depending on whether it is desired to wind or unwind the coils when the tooth has force applied to it.

In the operation of the device, when the tooth 26 comes in contact with an obstruction, it will tend to rise and either wind or unwind the coil 28, depending on the direction in which the raking drum is rotating. The inner end of the tooth member is provided with a loop 29 which is adapted to be engaged by a bolt 31 extending through the bar 18 for clamping the same in position on the bar.

In Figs. 8 and 9 is shown a further modified form of tooth construction which will permit the vertical or upward movement of the individual teeth while in service. In this form of construction, when the teeth encounter a projection extending above the surface of the ground, the tooth is free to move upwardly, similar to the construction shown in Figs. 1 to 5, inclusive, but by means of a different mechanism. In this form of construction, a resilient parallelogram is provided which has one of its sides rigidly connected to the rake bar 18 and to the opposite side of which is connected the tooth 32. In the form of the device shown, this parallelogram is made from a single length of spring wire 39 having the coils 31, 32, 33 and 34 therein. The connecting portion 35 between the coils 32 and 33 is provided with a loop 36 to which the upper end of the tooth 32 is secured, as by means of a bolt 37. The upper end of the tooth may be and preferably is provided with a coil 38 for resiliently retaining the tooth in operative position. The ends of the wire 39 are provided with loops 41 and 42 which are adapted to be rigidly attached to the rake bar 18, as by means of a clamping bolt 43. The coils 31, 32, 33 and 34 function as pivots for the parallelogram, whereby when the tooth 32 strikes an obstruction, it is moved upwardly without materially changing its angularity. The resiliency of the coils normally holds the tooth in its lowered operating position. While the coils are shown as being made from a single length of wire, it is understood that the parallelogram may be formed from wire sections, and, if desired, the tooth may be integral with one or more of these sections.

In Figs. 10 and 11 is shown a further modified form of construction wherein provision is made for upward movement of the individual teeth. In this form of the device, the parts are so constructed that the individual teeth may have an upward or vertical movement of pure translation.

In the form of the construction shown, a sleeve member 44 is mounted on the rake bar 18 and has a projection 45 having a longitudinal opening 46 therethrough. The opening 46 is counterbored as at 47 and the tooth member 48 extends through the opening 46 and has an enlargement as at 50 positioned within the counterbore 47. The enlargement 50 constitutes a shoulder for a spring 49 which encircles the upper reduced end 51 of the tooth 48 abutting against the enlargement 50 at one end and at its other end against a nut 52 having an opening 53 through which the reduced end 51 of the tooth extends. The sleeve 44 is rotatably mounted on the bar 18 and is held from lateral movement in one direction by any suitable means, as by means of a cotter pin 54. On the opposite side of the sleeve from the cotter pin is a coil spring 55 encircling the tube 18 (see Fig. 10), one end of which engages a recess 56 in the edge of the sleeve and its other end is rigidly connected to the bar 18 by a clamping bolt 57. It will thus be seen that the sleeve is restrained from rotating on the bar 18 by the spring 55 and that the tooth 48 is held in projected position by the spring 49.

In this form of construction, during the normal operation of the device, the spring 55 resiliently holds the tooth 48 in operative position and when the tooth strikes an obstruction extending above the surface of the ground, the tooth may move upwardly against the tension of the spring 49 without raising the entire bar and the remaining teeth from the ground.

In all forms of the device thus far described, the teeth are independently movable and the means provided permit movement of the raking portion of the tooth in an upward direction relative to its normal path of travel during the raking operation.

In all these forms, a coil spring is provided for permitting a slight rearward rotation of the tooth about the axis of the coil while in service in the conventional manner, and all except that shown in Figs. 10 and 11 means are provided or the parts so arranged that the tooth and coil may move upwardly against spring tension when the tooth strikes an obstruction. This is considered an important feature of the invention. Under certain conditions, is may be desirable to so mount the raking bar itself that it may be movable upwardly or radially inwardly when the teeth at either or both ends of the drum come in contact with an obstruction extending above the surface of the ground.

In Fig. 12 is shown a construction which will permit the rake bar to move radially inwardly. As shown, the arms 58 of the drum spider 59 mounted on the shaft 50 are each provided with slots 61 in which the squared end portion or bearing 62 in which the rake bar 60 is journaled, is adapted to slide.

A compression spring 63 seats against the inner side of the squared portion 62 for normally holding the same in the outer end of the slot 61. A bar 64 is secured across the outer end of the slot, as by means of the bolts 65, for limiting the outward movement of the squared portion or bearing 62. The teeth 66 are attached to the bars 60 in the usual manner. In this form of construction when the teeth at one end of the bar strike an obstruction extending above the surface of the ground, as shown in Fig. 12, they will cause the bar to rise, as shown in said figure, for passing over the obstruction.

In Fig. 13 is disclosed a modified form of construction in which mechanism is provided whereby the bar may be moved upwardly when the teeth encounter an obstruction. In this form of construction, the spider arms 67 have pivoted at their lower ends bar supporting members 68. Means are provided at the outer ends of the members 68 for holding the raking bar 18. As shown, a clamp 69 is employed for this purpose. The outer ends of the spider arms 67 are provided with lugs 71 for limiting the outward movement of the bar supporting member 68. The bar supporting members 68 and the spider arm 67 are provided with spring seats 72 and 73, respectively, for receiving the ends of the springs 74, as clearly shown in Fig. 13 of the drawings.

The spring 74 yieldably resists the pivotal movement of the bar supporting member 68, and under normal conditions the said member is held in contact with the lugs 71, but when one or more of the teeth engage an obstruction, the member 68 moves upwardly, as shown in Fig. 13, against the tension of the spring 74.

Under certain conditions, it may be desirable to construct the drum in sections, one section of which constitutes the driving means for the drum and the other of which constitutes the bar holding and teeth supporting section.

In Figs. 14 and 15 is shown one form of construction embodying these features. As shown in said figures, the drum shaft 75 has mounted thereon a disk 76 having a hub 77 keyed to the shaft 75 and constituting the driving section of a drum. The bar supporting section 78 of the drum is provided with spider arms 79 within which is journaled tooth supporting bars 81. The section 78 is provided with what may be termed a hub portion 82 which surrounds the inner portion 83 of the hub 77 and the driving portion of the drum. The bar supporting section 78 is driven from the disk 76 in any suitable manner. In the form of construction shown, the disk 76 is provided with a radial slot 84 in which is slidably mounted a driving lug 85 integral with or rigidly secured to a driving member 86 which in turn is rigidly secured to a laterally extending lug 87 mounted on one of the arms 79 at each end of the drum.

The driving lug 85 has curved side edges to permit more or less eccentric movement of the driving hub 82, which is necessary when the lug and the arm to which it is attached is in a horizontal position during the movement of certain of the rake teeth over a projection, that is, when the lug and slot are in a horizontal position, the lug will prevent vertical movement of the entire hub 82 but will cause the hub to move in a circular path to a limited extent about the driving lug as a center, the beveled ends of the lug permitting this slight circular movement.

The hub 82 is normally held in a position concentric with the shaft 75 by a plurality of radially extending springs 88 seating on suitable positioning lugs 89 and 91 on the hubs 82 and 83, as clearly shown on the drawings. Since the arrangement at both ends of the drum is the same, it is not thought necessary to illustrate or describe the two ends.

Any suitable form of tooth may be mounted on the tooth bars 81. In the form of construction shown, which is by way of example only, the teeth 92 are substantially of the form shown in Fig. 4 of the drawings, although it is understood that any of the other types of teeth disclosed may be employed. In the operation of the device, when one or more of the teeth encounter an obstruction, if it is of a height greater than can be compensated for by the clearance between the tooth coil and the bar, the bar together with the bar supporting portion of the drum will move upwardly against the resistance of the springs 88.

Should the driving lug 85 be in a horizontal position when the teeth strike an obstruction, the entire drum will be forced upwardly and will tend to rotate about the lug as a center. The curved edges of the lug will permit this action.

The form of construction shown in Fig. 16 differs from that disclosed only in the form of spring employed for resisting the upward movement of the spider 93 of the bar supporting portion of the drum. In this form of construction the spider 93 is normally held concentric with the drum shaft 94 by a pair of curved spring bars or members 95 and 96, each of which forms a closed symmetrical figure, one concentric with the other. These figures are four-sided, with the sides curved inwardly, as shown at 97 and 98 respectively. In this form of construction, the spider of the drum is driven in the same manner as that disclosed in Fig. 15. The springs 95 and 96 are placed in position under a slight compression and may be held in position by friction or by means of a plate similar to the flange 76 which may be attached to the outer end of the hub.

The driving mechanism is the same as that shown in Figs. 14 and 15.

While I have disclosed the tooth construction as associated with a combined rake and tedder, it is understood that this is by way of example only, since the teeth may be used on various types of rakes, tedders, hay loaders and the like.

This is a continuation in part of my application, Serial No. 661,276, allowed August 2, 1934, which matured in Patent No. 1,978,717, dated October 30, 1934.

It is thought from the foregoing taken in connection with the accompanying drawings that the construction and operation of my device will be apparent to those skilled in the art and that changes in size, shape, proportion and details of construction may be made without departing from the spirit and scope of the appended claims.

I claim as my invention:

1. In a farm implement having a horizontally arranged rake bar, a tooth having a portion coiled about said bar and having its coiled end secured to the bar, the coiled portion of said tooth being conical with its smallest diameter turn secured to the bar and the tooth depending from the largest diameter turn whereby said tooth in service is free to partially turn about said bar and to move upwardly relative thereto when the tooth strikes an obstruction.

2. In a farm implement, a drum having a tooth bar, a tooth comprising a body portion, an attaching portion, a conical coil in said body portion surrounding said bar adjacent to said attaching portion and means for rigidly connecting said attaching portions to said bar with the upper portions of the turns of all of said coils in contact with said bar and with the lower portions of said turns being increasingly spaced from said bar material distances.

3. In a farm implement, a rotating drum having tooth bars rotatable therewith, a plurality of teeth, means for attaching said teeth to said bar, each of said teeth at its attaching end having a plurality of conically arranged coils extending about the bar to which it is attached, said coils being spaced apart longitudinally of the bar.

4. In a farm implement, a rotating drum having tooth bars rotatable therewith, a plurality of teeth, means for attaching said teeth to said bar, each of said teeth at its attaching end having a plurality of coils extending about the bar to which it is attached and spaced a material distance apart and having the lower portions of their outer coils spaced a material distance apart for providing for free vertical movement of said tooth when it strikes an obstruction.

5. In a farm implement, a rotating drum having tooth bars rotatable therewith, a plurality of teeth, means for attaching said teeth to said bar, each of said teeth at its attaching end having a plurality of coils spaced apart and extending about the bar to which it is attached, the outer coils having their upper portions in close proximity to said bar and their lower portions spaced a material distance downwardly therefrom for providing vertical movement for said tooth when it strikes an obstruction.

6. In a hay rake having a rotating drum, horizontally arranged tooth supporting bars mounted on said drum and rotatable therewith, teeth carried by said bars and supported solely therefrom, and means having an end portion mounted in fixed relation with each bar so as to be movable therewith and having resilient portions extending inwardly of said bar and movable inwardly of said drum and angularly thereto for permitting vertical and angular movement of said teeth when the same encounter a projection in service.

7. In a combined hay rake and tedder, a rotating drum, tooth supporting bars carried by said drum, a plurality of teeth, means mounting said teeth on said bars including resilient portions movable circumferentially of said bars and toward said bars whereby said teeth are yieldably supported for vertical and angular movement with relation to the bars when the teeth encounter a projection in service.

8. In a combined hay rake and tedder, a rotating drum, tooth supporting bars carried by said drum, a plurality of teeth, means mounting said teeth on said bars including coiled spring portions movable circumferentially of said bars and toward said bars whereby said teeth are yieldably supported for vertical and angular movement with relation to the bars when the teeth encounter a projection in service.

9. In a farm implement having a rotating drum including a plurality of horizontally arranged tooth supporting bars, a plurality of teeth for said bars, means for securing said teeth to said bars, and a single continuous resilient means reacting between each of said teeth and a part of said drum providing for angular and independent upward movements of said tooth when the same strikes an obstruction during the operation of said implement.

10. In a hay rake or the like, a rotating drum, horizontal tooth bars rotatable with said drum, sleeve members resiliently mounted on said bars and yieldable for rotation about said bars, rake teeth slidably mounted within said sleeves, and resilient means within said sleeves for normally projecting said teeth from said sleeves in a substantially vertical plane.

11. In a raking mechanism, a raking bar, a rake tooth, and resilient means in the form of a parallelogram for securing said tooth to said bar, said means normally resiliently holding said tooth in extended position.

12. In a farm implement, a horizontally arranged rake bar, a plurality of resilient teeth, and means for attaching each of said teeth to said bar, each of said means comprising a resilient member arranged in the form of a quadrilateral with said bar attached to one side and the tooth attached to the opposite side of said quadrilateral.

THEODORE H. OPPENHEIM.